(12) United States Patent
Hacsi

(10) Patent No.: US 7,193,839 B2
(45) Date of Patent: Mar. 20, 2007

(54) METHODS OF STORING AND RETRIEVING ELECTRIC ENERGY

(76) Inventor: James Scott Hacsi, 13 Dartmouth Ave., Pueblo, CO (US) 81005-1755

( * ) Notice: Subject to any disclaimer, the term of this patent is extended or adjusted under 35 U.S.C. 154(b) by 401 days.

(21) Appl. No.: 10/822,876

(22) Filed: Apr. 13, 2004

(65) Prior Publication Data

US 2005/0225293 A1    Oct. 13, 2005

(51) Int. Cl.
*H01G 9/00* (2006.01)
(52) U.S. Cl. .................. 361/502; 361/508; 361/512; 361/306.1; 361/306.3; 429/218; 429/224; 320/9; 320/14; 320/37
(58) Field of Classification Search ........ 361/502–504, 361/508–512, 523–525, 306.1, 306.3; 429/218, 429/224; 320/2, 9, 14, 37
See application file for complete search history.

(56) References Cited

U.S. PATENT DOCUMENTS

| | | | | |
|---|---|---|---|---|
| 4,312,927 A | * | 1/1982 | Salmon | ................ 429/17 |
| 5,154,989 A | * | 10/1992 | Howard et al. | ........... 429/160 |
| 5,617,002 A | * | 4/1997 | Sakamoto | ................ 320/102 |
| 6,191,935 B1 | * | 2/2001 | Okamura et al. | ........... 361/502 |
| 6,477,035 B1 | * | 11/2002 | Cepas et al. | ............. 361/306.3 |
| 6,847,126 B2 | * | 1/2005 | Adamson et al. | ........... 290/1 R |

* cited by examiner

*Primary Examiner*—Nguyen T. Ha

(57) ABSTRACT

A method and apparatus for storing large quantities of electric energy in a small mass and volume at a high dc electric potential. Dispersed conductive particles 16 in a dispersing medium 15 contained in an insulator casing 21 between an insulating divider 11 and either a positive conductive plate 12 or a negative conductive plate 13 accumulate and store electric charges. A procedure of particle-to-particle charge pumping is employed to convey electric charges to and from the positive conductive plate 12 and the negative conductive plate 13 to the surfaces of each of a great multitude of dispersed conductive particles 16. Energizing results in oppositely charged dispersed conductive particles 16 becoming electrically bound to the surfaces of the insulating divider 11 with a large quantity of electric charges also residing on the outside surfaces of the repelling dispersed conductive particles 16, whereby the total effective capacitor plate surface area is greatly increased. A large effective plate surface area combined with a high working dc voltage allows a large quantity of electric energy to be stored in a small mass and volume that can also be retrieved very rapidly for doing useful work.

3 Claims, 1 Drawing Sheet

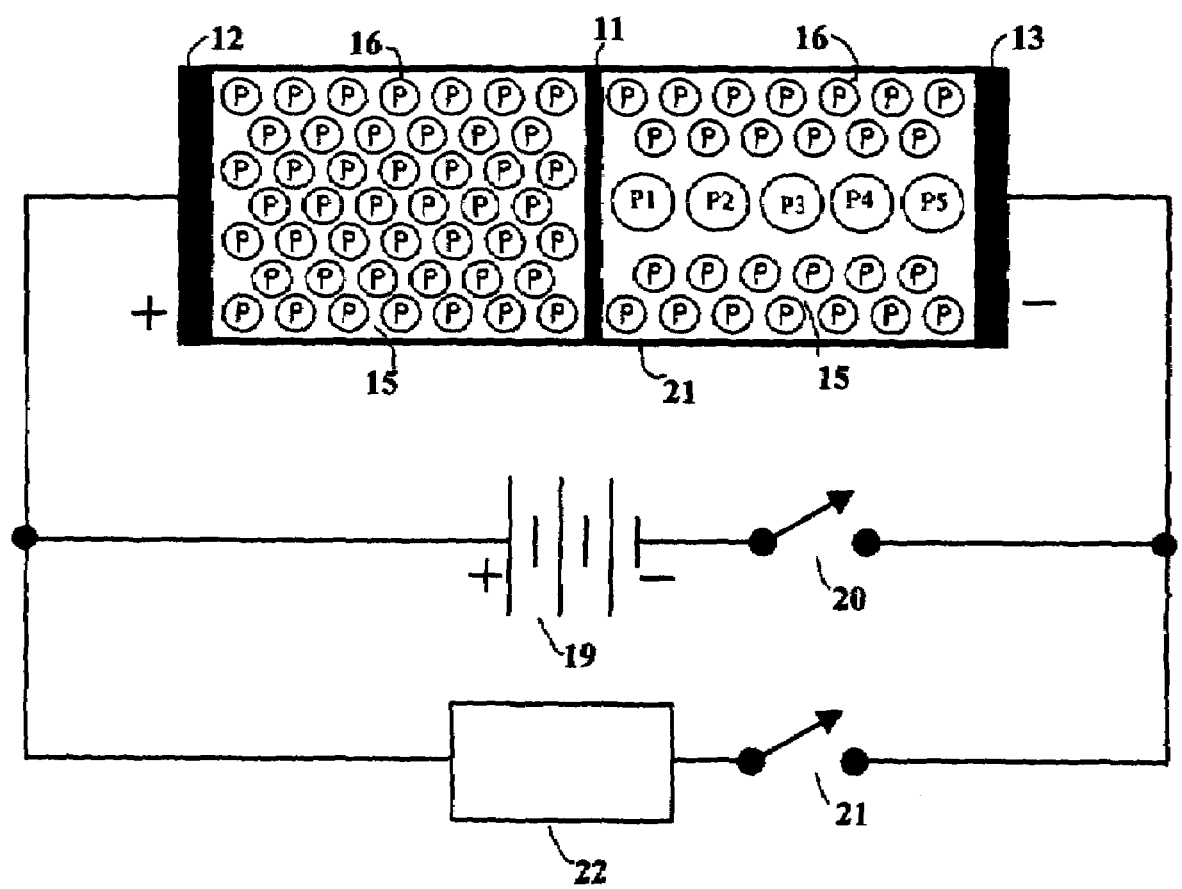

METHODS OF STORING AND RETRIEVING ELECTRIC ENERGY

CROSS-REFERENCE TO RELATED APPLICATIONS

Not applicable

STATEMENT REGARDING FEDERALLY SPONSORED RESEARCH AND DEVELOPMENT

Not applicable

BACKGROUND—FIELD OF INVENTION

The present invention relates to a method and apparatus for storing electric energy. More particularly, the present invention relates to a highly efficient method and apparatus for storing large quantities of electric energy in a small mass and volume at a high dc working voltage.

BACKGROUND—DESCRIPTION OF PRIOR ART

Ultracapacitors have very high values of capacitance due to their large effective plate surface area and very thin dielectric film. However, since the electric energy stored by a capacitor is proportional to the square of the charging voltage and only directly proportional to the value of capacitance, it seems reasonable to assume that the best way to store more electric energy in a capacitor is to energize the capacitor to the highest dc voltage possible. Unfortunately, the highest voltage, usually between one and two volts dc, to which ultracapacitors can be energized is limited to the voltage where electrical breakdown of the thin film occurs. Capacitors other than the electric double-layer type, utilize dielectrics that can withstand very high dc voltages before electrical breakdown and arcing result, but the relatively small effective plate surface area as well as the requirement to use thick slabs of dielectric material limits the capacitance and thus the amount of electric energy stored. Energy storage devices available commercially usually exhibit either a high energy density and high specific energy or a high power density and high specific power, but there is currently no electric energy storage device available today that stores large quantities of electric energy in a small volume and mass which can also supply the stored energy to an electrical load very rapidly. As a result, the driving range of a non-polluting electric vehicle is severely limited by the amount of electric energy stored by heavy, bulky, inefficient and ineffective electrochemical batteries. The acceleration and driving performance of such electric vehicles are both limited by the inability of electrochemical battery packs or fuel cells to deliver electric energy to the electric traction motors in a rapid manner when needed.

SUMMARY

It is therefore the object of the present invention to provide a method and apparatus for storing large amounts of electric energy in a small mass and volume. In accordance with these and other objects of the invention, there is provided a method and an apparatus having a set of capacitor plates where at least one plate is comprised of a multitude of dispersed particles in a dispersing medium for transferring and storing large quantities of electric charge.

Objects and Advantages

Accordingly, several objects and advantages of the method and device identified as the present invention are:
(a) to provide a method and apparatus for storing a relatively large quantity of electric energy in a small mass;
(b) to provide a method and apparatus for storing a relatively large quantity of electric energy in a small volume;
(c) to provide a method and apparatus for supplying a relatively large quantity of electric energy stored in a small mass to an electrical load device very rapidly when needed;
(d) to provide a method and apparatus for supplying a relatively large quantity of electric energy stored in a small volume to an electrical load device very rapidly when needed;

DRAWING FIGURE

FIG. 1 shows a schematic view of the apparatus that is the preferred embodiment of this invention along with related electrical circuitry for accomplishing the cycles of energizing and de-energizing.

REFERENCE NUMERALS IN DRAWING 11 insulating divider with high dielectric constant
12 positive conductive plate
13 negative conductive plate
15 dispersing medium
16 dispersed conductive particles
19 battery or electric power source
20 electrical switch for energizing
21 insulator casing
22 electrical load device
23 electrical switch for de-energizing

DESCRIPTION—FIG. 1

Preferred Embodiment

A preferred embodiment of the method and apparatus of the present invention is illustrated in FIG. 1 of the single drawing. An insulating divider 11 with a high dielectric constant and high dielectric strength divides the space inside the insulator casing 21 into two separate and distinct chambers. The first chamber contains a positive conductive plate 12 on the side opposite, and farthest away from the insulating divider 11, and the second chamber contains a negative conductive plate 13 on the side opposite, and farthest away from the insulating divider 11. Each isolated chamber is filled with a liquid dispersing medium 15 and a great multitude of solid dispersed conductive particles 16. In this preferred embodiment of the apparatus of the present invention a colloid comprised of solid dispersed conductive particles 16 having various shapes and sizes where each ranges in size from between 10 to 1000 Angstroms in diameter contained in a liquid dispersing medium 15 is used in each of the two chambers. Electrical connections are made between the positive conductive plate 12 and the positive electrode of the battery 19 during the energizing cycle. Electrical connections are also made from the negative conductive plate 13 to the negative electrode of the battery 19 through a closed electrical switch 20 during the energizing cycle. During the de-energizing cycle, connections are made between the positive conductive plate 12 and one terminal of the electrical load device 22 while connections are also made between the negative conductive plate 13 and another terminal of the electrical load device 22 through a second closed electrical switch 23. For the purpose of illustrating and defining the principle of "particle-to-particle charge pumping", several dispersed conductive particles 16 in one of the two isolated chambers have been exaggerated in size and have been appropriately labeled as P1 through P5 for easy identification.

Operation—FIG. 1

To start the energizing cycle, electrical switch 20 is closed while electrical switch 23 remains open. The negative conductive plate 13 immediately becomes negatively charged with respect to the positive conductive plate 12 and the difference in electric potential between the two conductive plates is equal to the voltage of the battery 19. At this point of the cycle, each dispersed conductive particle 16 contains a neutral or zero charge, so particle P5 is immediately drawn to the negative conductive plate 13 where it makes physical contact and accumulates a negative electrical charge equal to the charge of the negative conductive plate 13. As soon as electrical charges (electrons) are transferred to particle P5, the particle will be repelled from the negative conductive plate 13 because the two surfaces will be similarly charged. Neutrally charged particle P4 will be drawn to negatively charged particle P5 and after physical contact occurs between the two conductive particles, particle P4 will gain charge from particle P5—possibly half the charge of P5—and the two particles will be repelled from each other due to their like charges. It's important to point out that for electrical charge to be conserved in the closed system, a dispersed conductive particle 16 in the opposite chamber will be transferring charge (electrons) to the positive conductive plate 12. For that matter, everything occurring in one chamber, as far as electric charge transfer is concerned, will be matched by equal and opposite reactions in the other chamber so that electrical charge will always be conserved throughout the closed system. Now, neutrally charged particle P3 will be drawn to negatively charged particle P4 and after contact is made, approximately half the charge on P4 will be transferred to P3. Therefore, the described process where two dispersed conductive particles 16 attract toward one another, make physical contact, transfer electric charge, and then repel each other will be known from this point forward as "particle-to-particle charge pumping". So, particle-to-particle charge pumping will continue to take place between P3 and P2 and then P2 and P1. As soon as P1 receives electrical charge, however, it will be forced against the surface of the insulating divider 11 where it will become electrically bound to an oppositely charged dispersed conductive particle 16 of the colloid in the other chamber which also becomes bound to the opposite surface of the insulating divider 11. The oppositely charged particles on either side of the insulating divider, or dielectric, act as conductive plates of a tiny energized parallel-plate capacitor. During the energizing process, every time a conductive particle 16 transfers electrical charge to another particle down the line, so to speak, it will contain less electric charges than the particle it originally acquired charge from in the first place, and thus it will be attracted to and drawn back toward the predecessor particle to acquire additional charge. For example, as soon as P5 transfers half its charge to P4 it will again be drawn toward the more negatively charged negative conductive plate 13, make contact, acquire more electric charges (electrons), and once again be repelled from the conductive plate 13. Particle-to-particle charge pumping will take place until the opposite surfaces of the insulating divider 11 are completely filled with dispersed conductive particles 16 acting together as opposite plates of an energized parallel-plate capacitor. Motion and interaction of dispersed conductive particles 16 will continue and electric charge will be transferred particle-to-particle throughout the entire colloid in each chamber where each and every dispersed conductive particle 16 in both separate chambers have accumulated electric charge. Eventually the dispersed conductive particles 16 that are bound to the insulating divider 11 will become energized to the battery voltage and as soon as the total electric charge of the system is evenly distributed amongst all of the dispersed conductive particles 16, all particle motion in both chambers will cease. It is very important to realize that when the energizing cycle is complete, the dispersed conductive particles 16 in one chamber between the negative conductive plate 13 and the insulating divider 11, as well as the dispersed conductive particles 16 in the other chamber between the positive conductive plate 12 and the insulating divider 11 will each contain a significant quantity of electrical charge. A vast amount of electrical charge will be stored in the great multitude of highly charged dispersed conductive particles 16 that have essentially become an extension of the conductive plates into 3-dimensional space! In other words, the effective surface plate area capable of storing electric charge has been greatly increased to include the sum of the surface areas of all the billions and billions of miniscule dispersed conductive particles 16 combined! Particle-to-particle charge pumping allows capacitive devices to be contrived with very high values of capacitance that can be safely energized to many thousands of volts dc, and as a result large amounts of electric energy can be stored in a small mass and volume. Another peculiar characteristic of this apparatus is that an "electrical pressure" will be exerted by the energized dispersed conductive particles 16 in each of the two chambers on the walls of the rigid insulator casing 21 as the particles repel each other and seek an arrangement of minimized interaction. Moreover, the colloids in both chambers, including their dispersed conductive particles 16 and their dispersing mediums 15, can be removed from the insulator casing 21 after being energized (under pressure) and temporarily stored in insulated containers separate from the original energizing site. It is also important to remember that the dispersed conductive particles 16 must remain dispersed in the dispersing medium 15 and not be allowed to coagulate. After the energizing cycle is completed, both electrical switches are opened to retain the electrical charge of the apparatus.

The de-energizing cycle begins by closing the electrical switch 23 that provides an electrical conducting path through the electrical load device 22. The negative conductive plate 13 and the positive conductive plate 12 will seek to maintain a difference in electric potential as electric current (charges) flow through the electrical load device 22. Highly charged dispersed conductive particles 16 nearest the conductive plates will move toward the neutrally charged plates and transfer electric charge. For example, P5 will move toward the negative conductive plate 13, make contact, transfer charge, and then will be repelled. Particle-to-particle charge pumping will begin, but the transfer of charge will be in the opposite direction: P5 will gain charge from P4; P4 will gain charge from P3; P3 will gain charge from P2, and so on. Since each dispersed conductive particle 16 only transfers half its charge during contact with a neighboring particle, the de-energizing process will follow an exponential decay curve similar to other capacitors. Surprisingly, the dispersed conductive particles 16 originally bound to the insulating divider will be completely de-energized first and the dispersed conductive particles 16 nearest the conductive plates will be the last to be completely de-energized! Motion of the dispersed conductive particles 16 will continue until the total electric charge of the system is equal to zero.

Additional Embodiments

It should be evident to a reader skilled in the art that suspended or dispersed particles of any nature or material composition contained in any dispersing matter, medium or phase of any nature or composition capable of carrying out particle-to-particle charge pumping will accomplish the method identified as a primary aspect of the present invention. In words, colloids and suspensions comprised of conducting, non-conducting, or semi-conducting particles of various sizes and shapes comprised of gaseous, solid or liquid materials suspended or dispersed in any kind of dispersing medium or phase, whether it be a gas, liquid, solid, or other phase of matter, can possibly be employed to accomplish particle-to-particle charge pumping and thus the method described as the present invention. Additionally, it is very conceivable to employ ions of any nature and composition in solution (electrolytes) or adsorbed to other particles of any nature and size to accomplish particle-to-particle charge pumping which is key to accomplishing the described method of this invention. It should also be evident to a reader skilled in the art that a minimum of one plate comprised of suspended or dispersed particles as described above is required for particle-to-particle charge pumping, but the use of additional such plates is more effective and efficient.

CONCLUSIONS, RAMIFICATIONS AND SCOPE

Accordingly, the reader will see that the method and apparatus of this present invention is to be used to effectively and efficiently store large quantities of electric energy in a small mass and volume. Additionally, the stored electric energy can be made available to an electrical load for conversion to do useful work very rapidly and without much loss. Furthermore, the method and apparatus for storing electric energy has the additional advantages in that If used in electric vehicles, this alternative, non-polluting energy storage apparatus and method with a very high energy density and high specific energy will help clean up the environment and help stop global warming;

An energy storage apparatus and method of this nature will help decrease our nation's dependence on foreign oil by allowing large quantities of electric energy to be derived relatively slowly and efficiently during off-peak power intervals from renewable energy sources for use during periods of high-energy demand;

This method and apparatus of storing energy at very high working dc voltages is very efficient and effective since almost all of the stored energy can be subsequently retrieved to do useful work;

The advantage of storing electric energy at very high dc voltages insures that most of the stored electric energy will be provided to the electrical load for conversion to useful work rather than wasted as unwanted heat in other electrical components.

Although the description above contains many specificities, these should not be construed as limiting the scope of the invention but as merely providing illustrations of one of the presently preferred embodiments of this invention.

Thus the scope of the invention should be determined by the appended claims and their legal equivalents, rather than by the examples given.

What is claimed is:

1. A method for storing electric energy, comprising the steps of:
   (a) providing an electrically-uncharged apparatus comprised of two conductive plates, also known as electrodes, where said conductive plates are each located in a separate chamber and where each said separate chamber containing each said conductive plate is filled with a multitude of conductive particles dispersed in a dispersing medium and where each said conductive particle is free to move in said dispersing medium in each said separate chamber for transferring electric charges to and from each said conductive plate in each said separate chamber as necessary, and where fully-contained said separate chambers are located adjacent to each other and separated from each other, both physically and electrically, by electrically non-conductive matter, then
   (b) establishing a uniform or non-uniform electric field between said conductive plates located in each said separate chamber, then
   (c) transferring positive or negative electric charges and energy from each said conductive plate in each said separate chamber to said multitude of conductive particles dispersed in said dispersing medium contained in each said separate chamber using a particle-to-particle charge-pumping procedure, thus
   (d) accumulating said positive or negative electric charges on the outside surface of each said conductive particle dispersed in said dispersing medium in each said separate chamber by using said particle-to-particle charge-pumping procedure until each said conductive particle in each said separate chamber is energized to the same positive or negative electric potential or voltage as said conductive plate located in same said separate chamber, then
   (e) preventing stored said energy from dissipating by stopping said stored positive or negative electric charges from escaping from said surfaces of said multitude of conductive particles and from each said conductive plate in each said separate chamber,
   whereby a large quantity of electric energy is stored on the immense amount of combined surface area of said multitude of said conductive particles dispersed in said dispersing medium in each said separate chamber by using said particle-to-particle charge-pumping procedure.

2. The method for storing electric energy in claim 1 wherein said positive or negative electric charges are accumulated by a great multitude of solid, liquid, or gaseous conductive, non-conductive, or semiconductor particles dispersed in a solid, liquid, or gaseous dispersing medium in each said separate chamber by using said particle-to-particle charge-pumping procedure by physical contact or corona discharge until each said conductive, non-conductive, or semiconductor particle in said solid, liquid, or gaseous dispersing medium in each said separate chamber with each said conductive plate is energized to said same positive or negative electric potential or voltage.

3. A method of retrieving stored electric energy, comprising the steps of:
   (a) providing an electrically-energized apparatus comprised of two conductive plates, also known as electrodes, where said conductive plates are each located in a separate chamber and where each said separate chamber containing each said conductive plate is filled with a multitude of conductive particles dispersed in a dispersing medium and where each said conductive particle is free to move in said dispersing medium in each said separate chamber for transferring positive or negative electric charges to and from each said conductive plate in each said separate chamber as necessary, and where fully-contained said separate chambers are located adjacent to each other and separated from each other, both physically and electrically, by electrically non-conductive matter, then (b) making connections between each said conductive plate in each said separate chamber of said electrically-energized apparatus to an electrical load device so that electric current will flow through said electrical load device while each said separate chamber with said multitude of conductive particles in said dispersing medium contains a great quantity of previously stored positive or negative electric charges located on the surface of each said conductive particle in said multitude of conductive particle in each said separate chamber, then (c) allowing stored electric energy to flow through said electrical load device by permitting equally charged and repelling said conductive particles dispersed in said dispersing medium with said positive or negative electric charges in each said separate chamber to make electrical contact with each other and with said conductive plate located in same said separate chamber using a particle-to-particle charge-pumping procedure, thus (d) reducing the quantity of said stored positive or negative electric charges on said surface of said multitude of conductive particles in said dispersing medium in each said separate chamber using said particle-to-particle charge-pumping procedure until all said positive or negative electric charges stored on the immense combined said surface area of said multitude of conductive particles in said dispersing medium in each said separate chamber are depleted or until no more electric energy is required by said electrical load device, whereby a large quantity of electric energy that was stored in a small mass and volume is supplied to said electrical load device very effectively and efficiently by using said particle-to-particle charge-pumping procedure.

* * * * *